United States Patent [19]

Hailey et al.

[11] Patent Number: 5,118,934
[45] Date of Patent: Jun. 2, 1992

[54] FIBER FED X-RAY/GAMMA RAY IMAGING APPARATUS

[75] Inventors: Charles J. Hailey, San Francisco; Klaus-Peter Ziock, Livermore, both of Calif.

[73] Assignee: The United States of America as represented by the United States Department of Energy, Washington, D.C.

[21] Appl. No.: 562,299

[22] Filed: Aug. 3, 1990

[51] Int. Cl.⁵ .............................................. G01T 1/20
[52] U.S. Cl. .................................. 250/366; 250/367; 250/368; 250/369
[58] Field of Search ................. 250/368, 366, 367, 369

[56] References Cited

U.S. PATENT DOCUMENTS

| | | | |
|---|---|---|---|
| 3,873,838 | 3/1975 | Lee | 250/366 |
| 3,916,198 | 10/1975 | Coltman et al. | 250/366 |
| 4,272,678 | 6/1981 | Lange | 250/366 |
| 4,379,967 | 4/1983 | McIntyre | 250/368 |
| 4,560,877 | 12/1985 | Hoffman | 250/366 |
| 4,751,389 | 6/1988 | Karcher et al. | 250/366 |

OTHER PUBLICATIONS

Ponman, "Maximum Entropy Methods", Nucl. Instrum. & Methods, 221, 1984, pp. 72-76.
Lowry et al. "Ultra High-Speed Single-Shot Electronic Imaging", SPIE, 1082, 1989, pp. 185-197.

Primary Examiner—Carolyn E. Fields
Attorney, Agent, or Firm—L. E. Carnahan; Roger S. Gaither; William R. Moser

[57] ABSTRACT

X-ray/gamma ray imaging apparatus is disclosed for detecting the position, energy, and intensity of x-ray/-gamma ray radiation comprising scintillation means disposed in the path of such radiation and capable of generating photons in response to such radiation; first photodetection means optically bonded to the scintillation means and capable of generating an electrical signal indicative of the intensity, and energy of the radiation detected by the scintillation means; second photodetection means capable of generating an electrical signal indicative of the position of the radiation in the radiation pattern; and means for optically coupling the scintillation means to the second photodetection means. The photodetection means are electrically connected to control and storage means which may also be used to screen out noise by rejecting a signal from one photodetection means not synchronized to a signal from the other photodetection means; and also to screen out signals from scattered radiation.

11 Claims, 3 Drawing Sheets

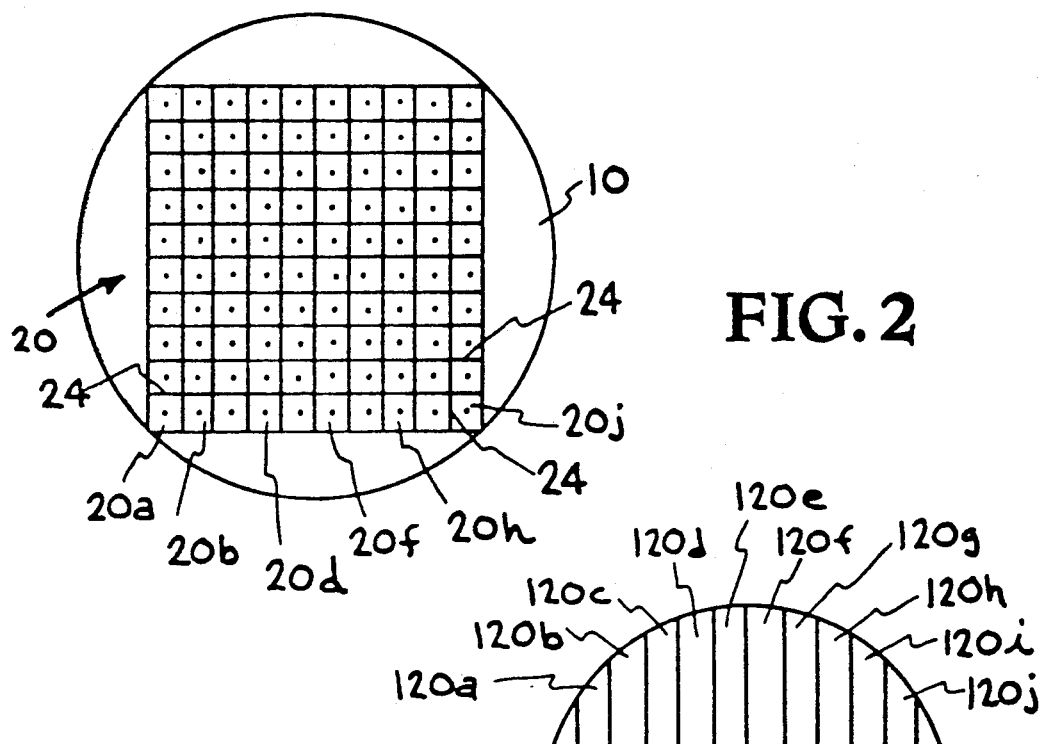
FIG. 2
FIG. 3
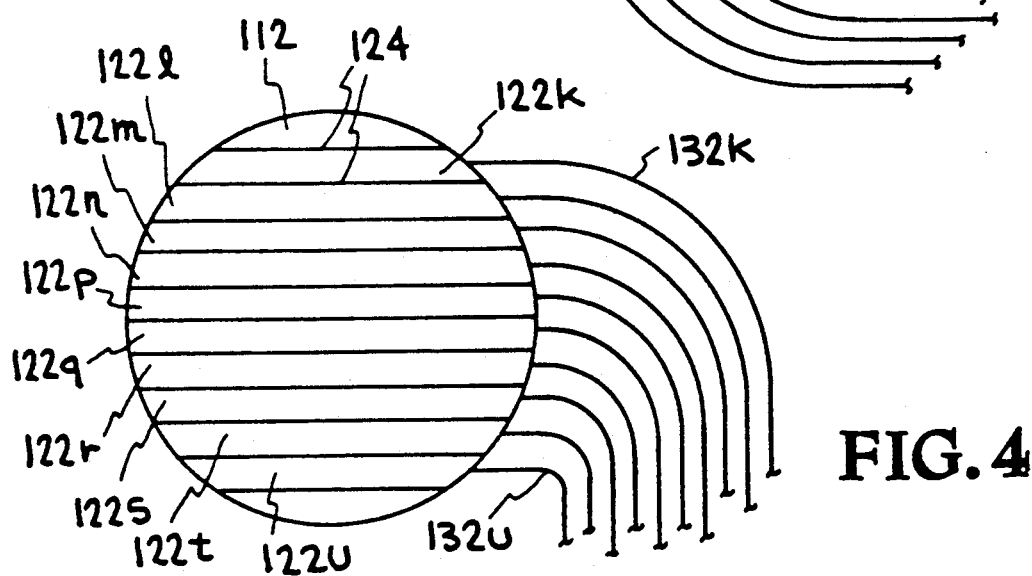
FIG. 4

FIBER FED X-RAY/GAMMA RAY IMAGING APPARATUS

BACKGROUND OF THE INVENTION

The invention described herein arose in the course of, or under, Contract No. W-7405-ENG-48 between the United States Department of Energy and the University of California.

This invention relates to apparatus for the detection and imaging of x-rays and/or gamma rays. More particularly, this invention relates to apparatus for determining the position and energy of x-rays and/or gamma rays which is also capable of rejecting noise or scattered rays.

The detection of x-rays and/or gamma rays using scintillators to convert the x-rays or gamma rays into photons which are then transmitted to photodetection means using optical fibers or light pipes is well known. For example, Lee U.S. Pat. No. 3,873,838 describes a two-dimensional radiation detector system wherein strips of scintillator material are arranged in a parallel planar array. The scintillator strips are coupled to optical detectors using optical fibers or light pipes to monitor scintillation along one axis. A series of light guides are bonded to the scintillators and comprise prisms which reflect light from a scintillation along one of the strips back and forth through adjacent strips to other light pipes which are coupled to the outermost strips in the detector array. The latter light pipes are coupled to other optical detectors to determine the second axis of the scintillation.

Coltman et al U.S. Pat. No. 3,916,198 teaches a radioisotope imaging system wherein the position of an amplified scintillation is determined by optical coding arrangements, including the use of fiber optic bundles coupled on one end to different positions on an output screen and at the opposite end to a series of photomultiplier tubes to determine the position of the scintillation. Another photomultiplier tube is coupled to all of the optical fibers for pulse detection and height analysis.

McIntyre U.S. Pat. No. 4,379,967 teaches a radiation image amplifier coding system in which electromagnetic radiation is converted to light signals which are transmitted to photomultiplier tubes by a fiber optic array comprising a matrix of optical fibers which are arranged in a particular coded array.

Hoffman U.S. Pat. No. 4,560,877 discloses a solid state detector of x-rays wherein scintillators convert the x-rays into photons and then function as light pipes to transmit the photons to an array of photodiodes by proper orientation of the scintillator crystal so that sides of the scintillator conform to the cleavage planes.

It would, however, be desirable to have an apparatus which would include means for measuring the intensity and energy of the radiation as well as means for determining the position of the radiation wherein both means are optically coupled to scintillation means and which, therefore, permits rejection of either noise or scattered rays.

SUMMARY OF THE INVENTION

It is, therefore an object of this invention to provide an apparatus comprising scintillation means to convert x-ray and/or gamma ray radiation into optical signals, which scintillation means are optically coupled to means for measuring the intensity and/or energy of the radiation and to means for determining the position of the radiation.

It is another object of this invention to provide an apparatus comprising scintillation means to convert x-ray and/or gamma ray radiation into optical signals, which scintillation means are coupled to photomultiplier means for measuring the intensity and/or energy of the radiation and to position sensitive photon detection means for determining the position of the radiation.

It is a further object of this invention to provide an apparatus comprising a plurality of scintillation means to convert x-ray and/or gamma ray radiation into optical signals, which scintillation means are mounted to photomultiplier means for measuring the intensity and/or energy of radiation and are each individually optically coupled to position sensitive photon detection means for determining the position of the radiation.

These and other objects of the invention will become apparent from the following description and accompanying drawings.

BRIEF DESCRIPTION OF THE DRAWINGS

FIG. 2 is a top view of a portion of FIG. 1 showing scintillator cubes mounted to the face of the photomultiplier tube and ends of optical fibers attached to each scintillator cube.

FIG. 3 is a top view of another embodiment of the invention showing a series of parallel scintillator bars attached to the face of a first photomultiplier tube for one-dimensional imaging.

FIG. 4 is a top view of the embodiment of FIG. 3 showing a second series of parallel scintillator bars attached to the face of a second photomultiplier tube wherein the second set of scintillator bars are rotated 90° with respect to the first series of scintillator bars.

DETAILED DESCRIPTION OF THE INVENTION

Figure 1:
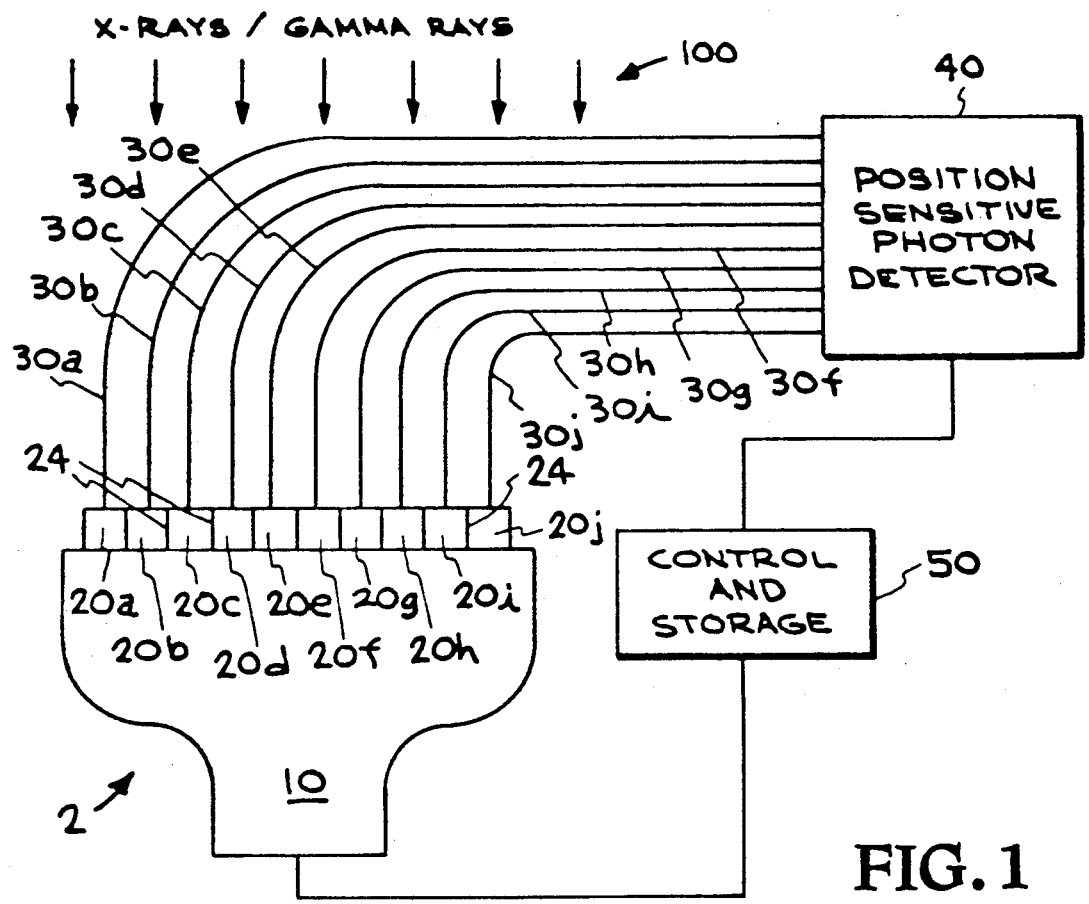
FIG. 1 is a vertical cross-sectional view of the fiber-fed imaging x-ray spectrometer of the invention.

Turning now to FIG. 1, the fiber-fed x-ray/gamma ray imaging apparatus of the invention is generally shown at 2 comprising a photomultiplier tube (PMT) 10, an array 20 of scintillator blocks mounted to the face of PMT 10, and a bundle 30 of optical fibers, ten of which are shown in FIG. 1 as 30a-30j, and each of which is respectively attached at one end to one of the scintillator blocks. The optical fibers are bonded, at their opposite ends, to the face of a position sensitive photon detector (PSPD) 40. PMT 10 and PSPD 40 are both electrically connected to a control means 50 capable of processing and storing the electrical signals received from PMT 10 and PSPD 40.

The main purpose of imaging apparatus 2 is to measure the intensity and/or energy of the radiation, as well as to establish the position of the radiation, using separate photodetection means for each function, and each of which is optically coupled to scintillation means.

Therefore, PMT 10 may comprise a large diameter photomultiplier tube which will then be capable of detecting the intensity and/or energy of x-rays or gamma rays from a large pattern of radiation through an array 20 of large scintillation blocks bonded to the face of photomultiplier tube 10. By bonding an optical fiber to each of the scintillation cubes, the radiation pattern falling on scintillation block array 20 and converted to a pattern of light images may be positionally transmitted to PSPD 40 as a demagnified light pattern or picture via optical light fiber array 30.

Array 20 of scintillation blocks, the first ten of which are shown as blocks 20a-20j in FIG. 1, may be either cubes or long strips. They are arranged, in this embodiment, as a two dimensional array of cubes, as shown in FIG. 2, with an optical fiber bonded to the exposed face of each scintillation cube. The material used to form the scintillation blocks, such as cubes 20a-20j, may comprise any common scintillation material such as, for example, an alkali halide material, e.g., sodium iodide, capable of emitting optical photons when struck by x-ray or gamma ray radiation. To optically isolate each scintillation block from adjacent blocks, metal foil, e.g., aluminum foil, separators 24 may be placed between each adjoining scintillation block.

Each scintillation block shown in FIGS. 1 and 2 is optically coupled to a position on the face of PSPD 40 corresponding to the position of the scintillation block on the face of PMT 10. In the embodiment shown in FIGS. 1 and 2, this optical coupling is shown as comprising a bundle 30 of optical fibers each of which are respectively bonded to a single scintillation block at one end and to a corresponding position on the face of PSPD tube 40 at the other end of the optical fiber. The optical coupling could also be accomplished by forming a lens on the exposed end of the scintillation block or cube and then focusing the light emitted by the scintillation block onto a particular position on the face of PSPD 40, corresponding to the position of that scintillation block on PMT 10.

The PSPD devices useful in the practice of the invention may comprise any position sensitive photon detector such as, but not limited to, a microchannel plate image intensifier or imaging phototube.

In operation then, radiation 100, which may comprise x-rays or gamma rays, falls on scintillation array 20 causing photon emission in scintillation blocks 20a-20j and/or the other cubes in array 20. This photon emission is detected by PMT 10 (regardless of which scintillation block or cube is struck). The photo emission is also transmitted to the appropriate pixel of PSPD 40 by the particular fiber coupled to the scintillation block struck by the radiation.

The intensity of the radiation is then electrically transmitted from PMT 10 to control and storage means 50 while the location of the radiation is electrically transmitted to control and storage means 50 from PSPD 40. This information may then be stored by means 50 for further processing or it may be transmitted to a cathode ray tube for reconstruction of a visual image, using both the intensity and location information.

However, this is not the only use which may be made of the detected information by control and storage means 50. The information being transmitted to control means 50 may also be used to eliminate noise by screening out any spurious transmission from either PMT 10 or PSPD 40 which is not simultaneous with a transmission from the other detection means since a bona fide signal, unlike noise, should be received simultaneously from both detectors.

Furthermore, the system may also be used to enhance image quality by rejecting x-rays or gamma rays which have been scattered and which, if detected, could result in loss of image quality. To accomplish such screening, control means 50 may compare the signal from PMT 10 with a standard or reference signal to eliminate signals which result from radiation of a different energy level striking the scintillation blocks. In this manner deflected or scattered radiation, which will have a lower energy, may be screened out, resulting in a sharper image. This rejection may also be carried out via a pixel to pixel "anticoincidence method, using two imaging PSPDs and staggering adjacent fibers between them. Then when an "image" is seen simultaneously from 2 fibers, it must be due to a scattered gamma-ray and such a signal may then be rejected.

While array 20 of scintillation blocks has been illustrated as 10 rows of scintillation cubes, such as 20a-20j in FIGS. 1 and 2, the scintillation blocks may also be arranged as long rectangular strips along the face of PMT 10, as shown in FIGS. 3 and 4. Thus, as seen in FIG. 3, parallel scintillation strips 120a-120j are arranged on the face of a first PMT 110, while a second set of parallel scintillation strips 122k-122n and 122p-122u, disposed at 90° to strips 120a-120j, are mounted to the face of a second PMT 112. In each case, the scintillation bars are optically separated from the adjoining bar by a metal foil strip 124. Each scintillation bar is also coupled, at the end of the bar, to an optical fiber. Thus, scintillation bar 120a is coupled to optical fiber 130a, scintillation bar 122k is coupled to optical fiber 132k, etc.

As in the previous embodiment shown in FIGS. 1 and 2, each optical fiber 130 and 132 may be bonded, at its opposite end, to the face of a PSPD device and the positional information thus optically transmitted may be converted into an electrical signal transmitted to control and storage means 50. However, in this embodiment, one PSPD device may be used for the bundle of optical fibers from one or more arrays of scintillation bars, i.e., optical fiber array 130 may be optically coupled to one PSPD device, while optical fiber array 132 may be optically coupled to the same or a second PSPD device.

It should be further noted that while two photomultiplier tubes are depicted, respectively, in FIGS. 3 and 4 with their arrays of scintillation bars arranged at 90° to one another, more than two of such photomultiplier tubes with arrays of scintillation bars thereon may be utilized, with other arrays of scintillation bars arranged at, for example, 45° angles to either of the depicted bars. When the number of such arrays is n, each array will be rotated from other arrays by 1/nth of 360°. The radiation pattern detected, converted to light images, transmitted to the PSPD(s), and then converted to electrical signals transmitted to control and storage means 50, may then be used to reconstruct a two dimensional visual image using known "Maximum Entropy Reconstruction" techniques such as described by T. J. Ponman, Nucl. Instr. Meth., 221 1984, P. 72; and by M. Lowry and B. Jacoby, SPIE Vol. 1082, "Ultra High-Speed Single-Shot Electronic Imaging", 1989, p. 185.

While this embodiment involves the use of more than one PMT device, it does offer advantages in simplicity of construction in that long bars of scintillation material may be used which may be easier to work with and the optical fiber may be bonded to an end surface of the bar, resulting in less physical clutter and easier assembly of the array on the face of the photomultiplier tube than the embodiment shown in FIGS. 1 and 2.

Figure 6:
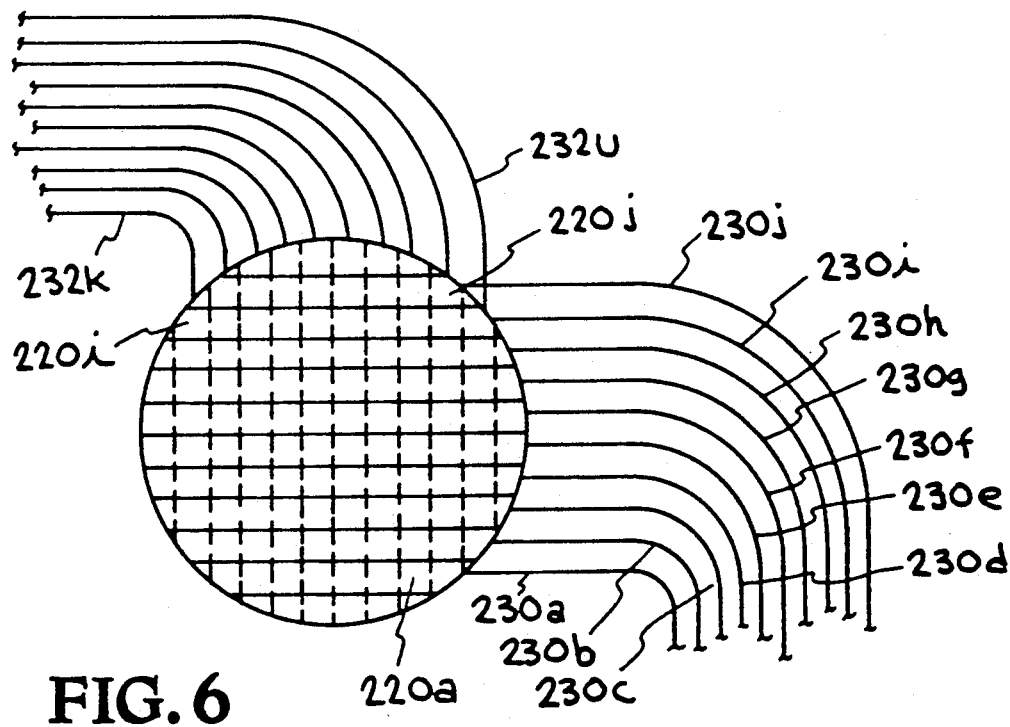
FIG. 6 is a section view of the embodiment of FIG. 5, taken along lines VI—VI, showing the two sets of parallel scintillator bars bonded together.
Figure 5:
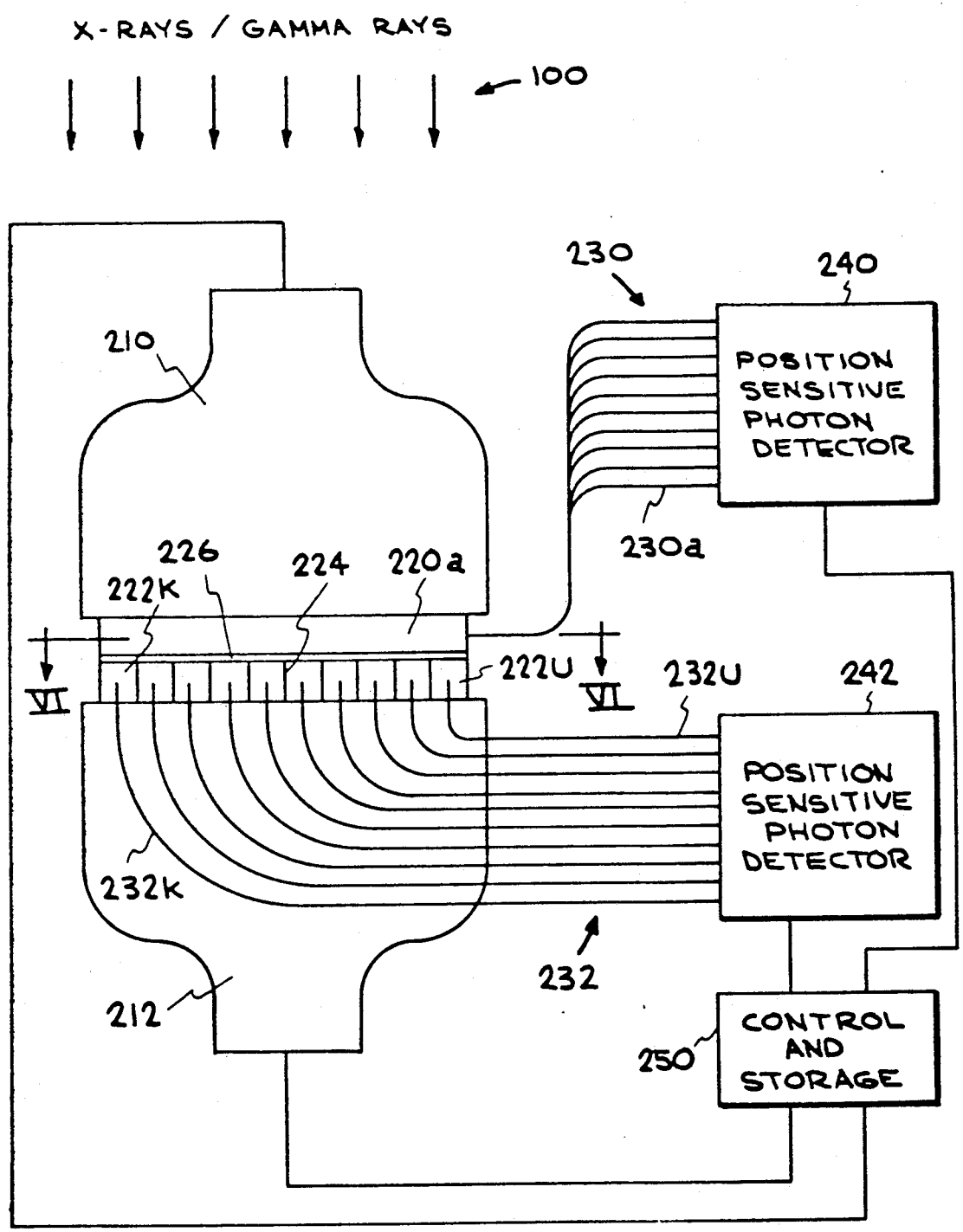
FIG. 5 is a vertical cross-sectional view of yet another embodiment of the invention wherein two photomultiplier tubes, each having a series of parallel scintillator bars attached to the face thereof, are bonded to each other in face to face relationship with one set of scintillator bars rotated 90° with respect to the other set of scintillator bars.

Turning now to FIGS. 5 and 6, yet another embodiment of the invention is depicted which combines some of the advantages of both of the previous embodiments. In this embodiment, two photomultiplier tubes 210 and 212 are used, each of which has bonded to the face thereof an array of scintillation bars and both of which are axially aligned to the radiation beam of x-rays or gamma rays.

Array 220 of scintillation bars, bonded to PMT 210, is optically coupled to PSPD 240 via optical fibers 230, while array 222 of scintillation bars, bonded to PMT 212, is optically coupled via optical fibers 232 to PSPD 242. PSPD devices 240 and 242, as well as PMT devices 210 and 212, are all electrically connected to control and storage means 250.

As shown more clearly in the section view of FIG. 6, scintillation bars 220a-220j, which are bonded to downwardly facing PMT device 210, are disposed at 90° to underlying scintillation bars 222k-222n and 222p-222u (shown in dotted lines) which are bonded to upwardly facing PMT device 212.

As in the previous embodiments, metal foil 224 is used to separate adjoining bars in each array. However, in addition, to avoid leakage of emitted light from one array to the other, a sheet of metal foil 226 is placed between the arrays as shown in FIG. 5. In this embodiment, radiation will pass through downwardly facing PMT 210, striking either a scintillation bar in array 220 or a bar in array 222 (or both), passing through foil layer 226 to impinge on a bar in array 222. The intensity and energy of the particular x-ray or gamma ray will then be detected by either PMT 210 or PMT 212 (or both).

In each embodiment, scintillation means, capable of emitting photons upon excitation by x-ray or gamma ray radiation impinging thereon, are bonded directly to the face of a photodetection device such as a photomultiplier tube capable of measuring the intensity and energy of the radiation; and in each case the scintillation means are also respectively optically coupled to the face of a position sensitive photon detector in positional order so that both the position and intensity of the radiation may be detected and converted into separate—but synchronous—electrical signals for further processing.

Thus, the invention provides an apparatus for the detection of x-ray or gamma ray radiation wherein the intensity or energy of the radiation and the position of the radiation may be separately detected and converted into separate electrical signals from which a visual signal may be reconstructed and wherein noise may be suppressed for example, through the use of anticoincidence rejection techniques between crystal planes 220 and 222, as well as scattered radiation, resulting in an image of enhanced quality.

While specific embodiments of the x-ray/gamma ray imaging apparatus of the invention have been illustrated and described for carrying out the formation of an enhanced visual image from the pattern of x-ray/gamma ray radiation in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. X-ray/gamma ray imaging apparatus for detecting the position, energy, and intensity of a pattern of x-ray/gamma ray radiation and generating photons in response thereto comprising:
   a) a two dimensional array of optically isolated scintillation block means disposed in a plane in the path of such radiation for generating photons in response to such radiation;
   b) a single photodetection tube means having a face thereon directly bonded optically to each of said block means in said array of scintillation block means for generating an electrical signal indicative of the intensity and energy of the radiation by detecting the photons emitted by any of said scintillation block means in said array;
   c) a single position sensitive photon detector means for generating an electrical signal indicative of the position of photon radiation striking said two dimensional array of scintillation block means;
   d) optical coupling means for coupling each of said scintillation block means in said two dimensional array with a corresponding position on the front face of said position sensitive photon detector means to thereby optically transmit a pattern of photon radiation to said position sensitive photon detector means positionally corresponding to the pattern of radiation striking said two dimensional array of scintillation block means.

2. The apparatus of claim 1 wherein said optical coupling means for optically coupling said array of scintillation block means to said position sensitive photon detector means comprise a plurality of optical fibers.

3. The apparatus of claim 2 wherein said single photodetection tube means comprises a photomultiplier tube.

4. The apparatus of claim 2 wherein a first end of each of said optical fibers is optically bonded to one of said scintillation block means in said array and bonded at an opposite end in the same positional sequence to said front face on said position sensitive photon detector means.

5. The apparatus of claim 4 wherein said position sensitive photon detector means comprises a microchannel plate image intensifier.

6. The apparatus of claim 4 including control means for processing an electrical signal generated from said single photodetection tube means and an electrical signal generated from said position sensitive photon detector means.

7. The apparatus of claim 6 wherein said control means further comprise means for rejecting noise by rejecting a signal from either said single photodetection tube means or said position sensitive photon detector means which is not synchronized with a signal received from the other.

8. The apparatus of claim 6 wherein said control means further comprise means for comparing the energy of each x-ray/gamma ray of radiation detected by said single photodetection tube means with one another and rejecting radiation of an energy indicative of the detection of scattered radiation.

9. X-ray/gamma ray imaging apparatus for detecting the position, energy, and intensity of a pattern of x-ray/gamma ray radiation and generating photons in response thereto comprising:
   a) a first array of parallel, but optically separated, scintillation bar means disposed in a first plane in the path of such radiation for generating photons in response to such radiation and optically bonded directly to first photomultiplier means for generating an electrical signal indicative of the intensity and energy of the photons emitted by any of said scintillation bar means in said first array;

b) a second array of parallel, but optically separated, scintillation bar means disposed in a second plane parallel to said first plane and also disposed in the path of such radiation for generating photons in response to such radiation, said second scintillation bar means being optically bonded directly to second photomultiplier means for generating an electrical signal indicative of the intensity and energy of any of the photons emitted by said scintillation bar means in said second array, said second array and said second photomultiplier means being coaxially mounted facing said first array and said first photomultiplier means with the major axes of said parallel scintillation bar means in said first array in said first plane being rotated 90° with respect to the major axes of said parallel scintillation means in said second array in said second plane disposed parallel to said first plane;

c) optical shielding means disposed between said first and second arrays of parallel scintillation bar means to prevent photons emitted by bar means in either of said arrays from entering the other array;

d) first and second position sensitive photon detection means, for respectively generating an electrical signal indicative of the position of the radiation in said radiation pattern; and e) optical fiber means for respectively optically coupling said first and second arrays of said scintillation bar means in positional order to said first and second position sensitive detection means, each of said optical fiber means bonded at one end to a single scintillation bar and at its other end to a position of a face of said position sensitive detection means corresponding to the position of said bar in said first or second array.

10. X-ray/gamma ray imaging apparatus for detecting the position, energy, and intensity of a pattern of x-ray/gamma ray radiation and generating photons in response thereto comprising:

a) a first array of optically isolated and parallel scintillation bar means disposed in a first plane in the path of such radiation for generating photons in response to such radiation;

b) a first photodetection tube means having a face thereon directly bonded optically to each of said bar means in said first array of parallel scintillation bar means for generating an electrical signal indicative of the intensity and energy of the radiation by detecting the photons emitted by any of said scintillation bar means in said first array;

c) a first position sensitive photon detector means for generating an electrical signal indicative of the position of photon radiation striking a front face of said first array of parallel scintillation bar means;

d) first optical coupling means comprising optical fibers which respectively couple each of said parallel scintillation bar means in said first array with a corresponding position on the front face of said first position sensitive photon detector means to thereby optically transmit a pattern of photon radiation to said first position sensitive photon detector means positionally corresponding to the pattern of radiation striking said first array of parallel scintillation bar means;

e) a second array of optically isolated and parallel scintillation bar means disposed in a second plane in the path of such radiation parallel to said first plane, said second array of scintillation bar means also generating photons in response to such radiation, the major axes of said parallel scintillation bars in said second array being rotated 90° to the major axes of said parallel scintillation bar means in said first array;

f) a second photodetection tube means having a face thereon directly bonded optically to each of said bar means in said second array of parallel scintillation bar means for generating an electrical signal indicative of the intensity and energy of the radiation by detecting the photons emitted by any of said scintillation bars means in said second array;

g) a second position sensitive photon detector means for generating an electrical signal indicative of the position of photon radiation striking a front face of said second array of parallel scintillation bar means;

h) second optical coupling means comprising optical fibers which respectively couple each of said parallel scintillation bar means in said second array with a corresponding position on said front face of said second position sensitive photon detector means to thereby optically transmit a pattern of photon radiation to said second position sensitive photon detector means positionally corresponding to the pattern of radiation striking said second array of parallel scintillation bar means; and i) control means for processing electrical signals respectively generated by said first and second photodetection tube means and said first and second position sensitive photon detector means.

11. The apparatus of claim 10 wherein each of said first and second position sensitive photon detector means comprises a microchannel plate image intensifier.

* * * * *